Figure 1:
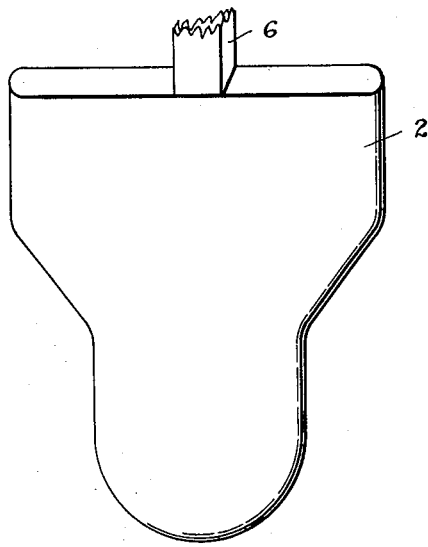

Nov. 4, 1941.    E. E. HABIB    2,261,466
FOOD CASING
Filed Dec. 24, 1938

Inventor:
EMILE E. HABIB
By Theodore C. Browne
Eber J. LeGates
Attorneys.

Patented Nov. 4, 1941

2,261,466

UNITED STATES PATENT OFFICE 2,261,466

FOOD CASING

Emile E. Habib, Arlington, Mass., assignor to Dewey and Almy Chemical Company, North Cambridge, Mass., a corporation of Massachusetts Application December 24, 1938, Serial No. 247,549

6 Claims. (Cl. 99—181)

This invention is concerned with the preservation of food in thin, flexible and impervious casings and relates particularly to an improved material for the formation of such casings.

Although this invention is applicable to any food product in the preservation of which the use of thin, flexible and impervious casings is desirable and is applicable to preservation at any temperature, it is particularly suitable for use in preserving meats by refrigeration or low temperature treatment, and consequently, for convenience in description, I shall describe it as applied to the preservation of fowl and dressed carcasses of smaller animals by freezing or chilling.

It has been proposed to enclose foodstuffs to be preserved by freezing or chilling in thin-walled bags of flexible materials, such as rubber or a rubber hydrohalide, and to evacuate the air from the bag and seal it hermetically. Very quick freezing may then be obtained because the covered carcass may be brought into direct contact with the refrigeration medium, such as air or brine, without suffering either contamination or desiccation. Meats stored in such bags after freezing have shown an improved quality over those not so protected.

Casing materials heretofore proposed, however, have lacked to a serious degree various of the properties desired. If ordinary rubber is used, the vulcanizing agents may impart obnoxious odors or tastes to the food. Unvulcanized rubber bags must be coated with soaps or dusted with talc, starch or an equivalent material to reduce their stickiness so that they can be shipped and stored and so that the completed packages can be handled conveniently and stored without adhering to each other. Unless these materials are removed from the inside of the bags before the food products are inserted they may leave an objectionable coating on the food. It is, of course, an expensive and commercially impracticable procedure to remove the material from the inside of the bag without removing it from the outside at the same time. Starch, recognized as the most satisfactory of these materials, tends to promote the growth of molds.

The bags heretofore proposed are subject to puncturing and tearing in handling, even at low temperatures. This defect has necessitated the use of bags having relatively thick walls, adding to the expense and interfering with the heat transfer through the bags when the products are frozen.

Many of the advantages of using envelopes in food preservation result from the decreased evaporation and decreased possibility of contamination that am impervious wrapping secures. Rubber materials heretofore proposed lack the high degree of moisture impermeability desired in envelopes in which food products are likely to be stored for long periods of time.

Bags of other materials which have been proposed are defective either because they require after application heat treatment at undesirably high temperatures or because of the high cost of fabricating the material into a completed food covering or because of a low degree of pliability and deformability. Unless the material is highly pliable and deformable, it is difficult to seal off the necks of the bags after evacuating them without allowing some air to reenter the bag.

Figure 2:
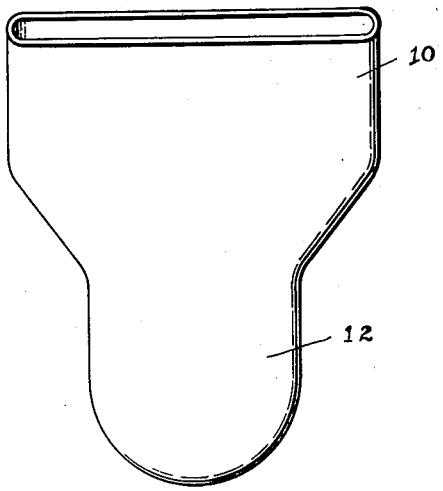

It is accordingly the principal aim and object of the invention to provide an inexpensive envelope, suitable for packaging food products, which is non-tacky, pliable and deformable, impermeable to moisture and both thin and strong. A further object is to provide an envelope which possesses to a high degree the mechanical properties desired in food casings and which at the same time is transparent and attractive in appearance and will form a salable commercial package. Further objects and advantages of my invention will become apparent from the following specification and from the drawings forming a part thereof, in which, Figure 1 is a perspective view of a form suitable for making the envelopes by dipping, and Figure 2 is a perspective view of a completed dipped envelope before it has been inflated.

I have discovered that envelopes made from an unvulcanized rubber composition including certain modifying agents in certain proportions are adapted to use in the preservation of meats to a wholly unexpected degree. By the use of this composition it is possible to effectively preserve foodstuffs in envelopes which are amply resistant to tearing and puncturing and at the same time so inexpensive, because of their thinness, that they may be discarded after use. This composition is non-tacky and bags made from it need not be dusted or coated to lower their adhesiveness.

I may use any modifying agent which will reduce the tack of unvulcanized rubber to a sufficient extent, will decrease the permeability of the material to moisture, and which will not seriously decrease its attractiveness as a packaging material.

The modifying agents which are best adapted to my purposes are characterized not only by the fact that they reduce the tack of the rubber material but also by their unexpected effects on the moisture permeability and tensile strength of the material. In general, the materials useful in this relation are those which are water insoluble and do not dissolve the rubber to any substantial extent at ordinary temperatures and tend to produce a non-tacky surface. Materials which are toxic or odorous or which adversely influence the ageing properties of the rubber are to be avoided. Examples of suitable materials are:

I. The waxes such as paraffinic and other petroleum waxes, beeswax, carnauba wax, japan wax, ceresin wax and other materials of a waxy nature, and
II. The oils and fats (liquid or solid glycerides of the higher fatty acids) which have no solvent effect on the rubber, such as castor oil; and the factices.

For the purpose of further illustrating the invention I shall give the following specific examples of compositions suitable for making the envelopes. These examples are illustrative only as the compositions may be modified considerably and still fall within the scope of my invention. The proportions are by weight.

*Example I*

An emulsion of "Esmonta" wax in water is first formed, using casein as an emulsifying agent, as follows: 3 parts of casein are stirred in 10.2 parts of warm water and 2.4 parts of ammonia, until the casein is thoroughly dissolved, when 14.6 parts of hot water are added with thorough stirring and the temperature raised to 185° F. 23.1 parts of carnauba wax, 6.6 parts of paraffin wax and 3.3 parts of ceresin wax are melted together at 185° F. and added to the casein solution with brisk stirring until a stable emulsion is formed. A dipping bath is then formed by slowly stirring the emulsion into 527 parts of a centrifugally concentrated latex of 60% solids content. A flat form of the shape illustrated in Figure 1 is dipped in the bath one or more times and a deposit of rubber on the form brought about by any of the well known dipping procedures. When a coating of sufficient thickness is formed the form is withdrawn from the bath, the coating allowed to dry thoroughly and the bag stripped from the form.

*Example II*

An emulsion of "Esmonta" wax in water is first formed, using ammonium stearate as an emulsifying agent, as follows: 63 parts of carnauba wax, 18 parts of paraffin wax and 9 parts of ceresin wax are melted together with 10 parts of stearic acid until clear when 60 parts of cold water are added. The mixture is heated until it again becomes clear and a mixture of 10 parts concentrated ammonium hydroxide and 10 parts of water is added slowly with vigorous stirring to produce a stable emulsion. A dipping bath is then formed by slowly stirring the emulsion into 1666 parts of a centrifugally concentrated latex of 60% solids content. A form of the shape illustrated in Figure 1 is dipped in the bath one or more times and a deposit of rubber on the form brought about by any of the well-known dipping procedures. When a coating of sufficient thickness is formed, the form is withdrawn from the bath, the coating allowed to dry thoroughly and the bag stripped from the form.

The composition of my invention may be formed into bags by any of the usual rubber working procedures, but it is most economical to form the bags by dipping and I prefer to form them in this way. Although bags sufficiently large and with sufficiently thin walls can be formed by dipping, this procedure involves manufacturing difficulties and I prefer to form the bags of a small size and to bring them to the proper size and wall thickness by stretching them. To stretch the bag it is merely necessary to gather the open end about an inflating nozzle and blow in air until the bag reaches the size desired. It is preferred, however, to stretch the bag by expanding it into a container by lowering the pressure in the container.

It has been found that the waxy modifying agents of this invention produce a marked and unexpected improvement in the tensile strength and resistance to tearing of envelopes formed by the stretching procedure described above. Thus, test specimens cut from an inflated envelope made from the composition of Example II show a tensile strength of about 11,000 pounds per square inch at 32° F. and similar specimens made from the composition of Example I a tensile strength of about 11,500 pounds per square inch. The tensile strength of corresponding unmodified, unvulcanized latex films under similar conditions is in the neighborhood of 8,500 pounds per square inch. The modifying agent in this instance produces a tensile strength increase in the neighborhood of 23%. For a given percentage of modifying agent the increase in tensile strength becomes progressively less as the temperature is increased. The strength increase also varies with the proportion of wax, reaching a maximum, when the modifying agent of the examples is used, in the neighborhood of 10% modifying agent at 32° F. and at about 20–30% modifying agent at 70° F. At the refrigerating temperatures at which these bags are normally used, bags made according to Example II have shown a strength increase with all proportions of wax from about 2% up to about 45%.

The proportion of modifying agent added to the latex should be sufficient to render the bag non-tacky, but not so large as to cause an objectional amount of surface "bloom," or to impair substantially the strength, resistance to tearing and other mechanical properties of the completed bags. The exact proportion to be used is in each instance dictated by the nature of the modifying agent and the temperature at which the bags are to be used, higher proportions of wax being required at higher temperatures. When the mixture of waxes of the examples is used, satisfactory reduction of tackiness may be obtained with from 2% to 100% wax (based on the solids content of the latex), although samples containing more than about 45% wax do not show an increased strength over that of unmodified rubber at 32° F.

Envelopes made from my compositions exhibit a high degree of permanent set after stretching, particularly at low temperatures, that is, the envelopes, when stretched as by inflation return only slightly toward their original size. In this condition they are unstable to a rise in temperature, springing back when heated to a size about 20–25% larger than the original size. In packaging articles in the bags, advantage may be taken of this property of the material to shrink the bag into intimate contact with the article by subjecting the bag momentarily to a temperature of about 130° F.

Envelopes of the modified rubber of this invention display a decreased permeability to moisture over those heretofore proposed, and thus serve to retain the natural moisture content of the food products packed in them during freezing and storage. This property is of particular advantage in connection with the preservation by freezing of products which tend to suffer "freezer burn" during storage, as this effect will be prevented by the retention of moisture at the surface of the food product which results from the use of these impermeable envelopes.

Due to the pliability and deformability of the material the necks of the envelopes may be readily sealed hermetically after evacuation by gathering the material of the neck together and securing it tightly. The surfaces of the folds of material will lie so closely together that no air can enter.

A form suitable for dipping envelopes for covering chickens is illustrated in Figure 1. It comprises a form body portion 2 and an extension 6 for supporting the form from a dipping frame. The form body may be provided with a groove near its upper end to form a bead on the neck of the envelope, and has its margins rounded as shown. If desired, a small pin may be formed on or inserted in the form body to form an evacuating tube on the envelope.

The envelope may, if desired, be dipped on a simple cylindrical form and allowed to conform to the carcass during evacuation, with the formation of folds and wrinkles where necessary.

An unexpanded envelope suitable for covering a chicken is shown in Figure 2. The neck portion 10 is preferably somewhat thinner than the body portion 12. The neck portion 10 is of a larger diameter than the body portion 12 to facilitate application of the envelope.

The envelopes of this invention may be used to protect meats during otherwise conventional tendering treatment, to prevent the surface spoilage and growth of mold which always accompanies tendering in the open air or inside a permeable covering.

The envelope may also be used to protect foodstuffs which are to be chilled by conventional chilling treatment and to secure best results should be left on the meat until it is to be cut up by the retail butcher. At the temperature of chilled beef my envelopes possess very little resiliency, and will not tear if inadvertently punctured by a hook.

The envelopes find their greatest advantages in connection with foods to be frozen. At freezing temperatures the bag material is substantially dead and inelastic and highly resistant to scraping and abrasion. It is advisable to retain the envelope on frozen carcasses until after thawing is completed. The meat is thus protected from the thawing water or air and, in addition, the phenomenon known as "drip" is prevented to such an extent that beef frozen and thawed in the envelopes is of a high quality.

I claim as my invention:

1. An envelope suitable for enclosing food products consisting of a thin moisture impermeable and non-tacky membrane comprising unvulcanized rubber modified by the presence of a material selected from the group consisting of paraffin waxes, ceresin wax, beeswax and carnauba wax in sufficient quantity to render the envelope non-tacky.

2. A moisture impermeable, flexible and non-tacky envelope, adapted for use for the protection of meat and other foodstuffs during refrigeration, consisting of unvulcanized rubber and less than about 45% of a wax.

3. An envelope for encasing and protecting foodstuffs during refrigeration and storage consisting of a thin walled, continuous single ply film comprising a continuous phase of unvulcanized, latex-deposited rubber and dispersed particles of a non-tacky, water insoluble wax which does not dissolve rubber at room temperature, the wax being present in such proportion as to render the envelope non-tacky.

4. An envelope for the protection of foodstuffs during refrigeration and storage consisting of a stretched film in a state of physical instability such that it is capable of shrinking when heated and comprising an unvulcanized rubber composition containing less than about 45% of a waxy modifying agent of such characteristics as to impart additional strength at refrigerating temperatures over that of a similar unmodified rubber film.

5. An envelope for protecting foodstuffs during refrigeration and storage consisting of a single-layer membrane in a state of physical instability such that it is capable of shrinking when heated and comprising latex-deposited rubber and less than about 45% of a wax selected from the class consisting of paraffin, ceresin wax, beeswax, and carnauba wax.

6. A moisture impermeable, flexible and non-tacky envelope, adapted for use for the protection of meat and other foodstuffs during refrigeration comprising as its principal constituents unvulcanized rubber and less than about 45% of a wax.

EMILE E. HABIB.